Figure 1:
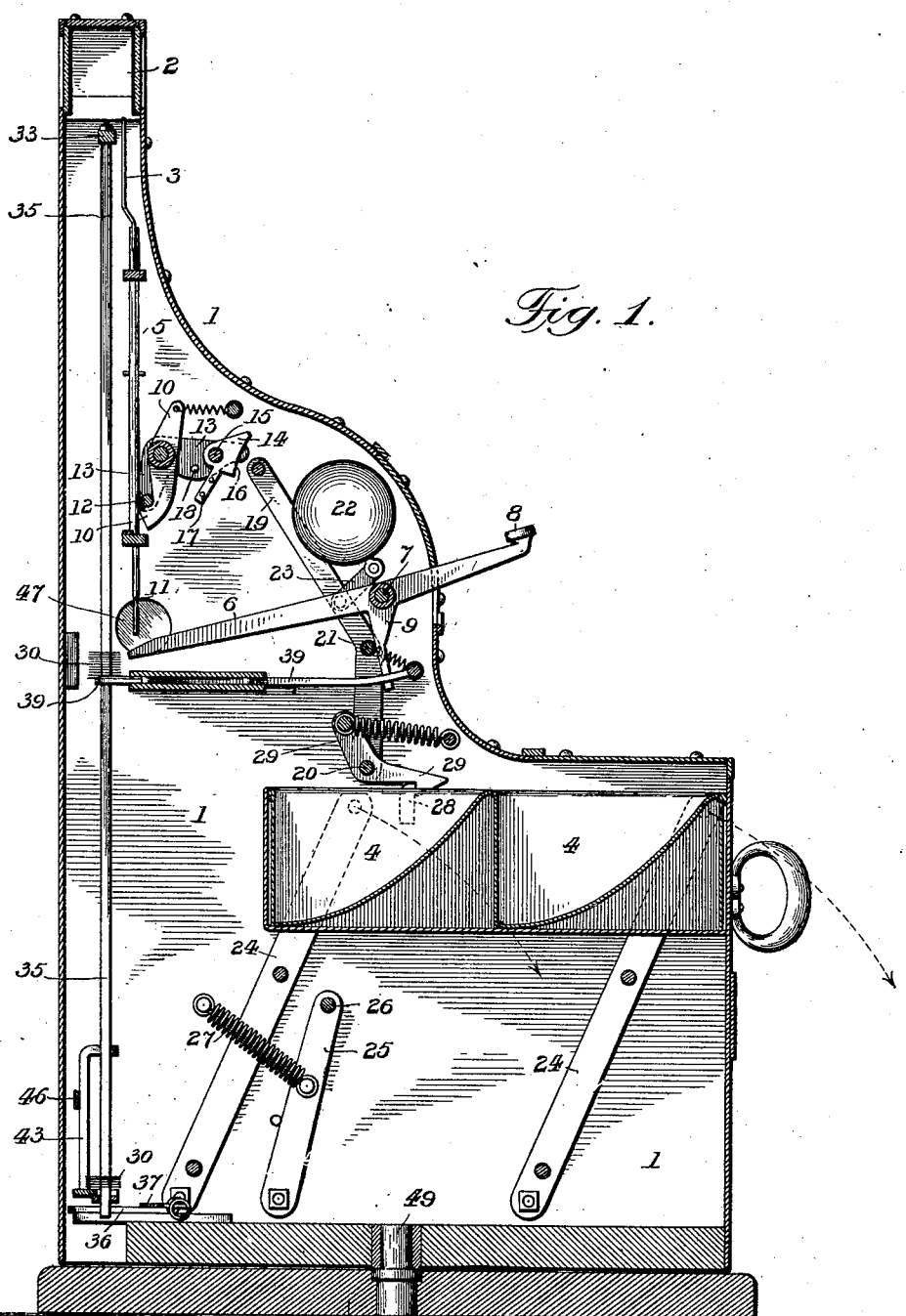

No. 679,251. Patented July 23, 1901.
G. BROWNING.
CASH REGISTER.
(Application filed Oct. 15, 1900.)
(No Model.) 6 Sheets—Sheet 1.

Attest:
John Enders Jr.
Henry A. Nott

Inventor:
George Browning,
by Robert Burns
Attorney.

No. 679,251. Patented July 23, 1901.
G. BROWNING.
CASH REGISTER.
(Application filed Oct. 15, 1900.)
(No Model.) 6 Sheets—Sheet 2.

Attest:
John Enders Jr.
Henry A. Nott.

Inventor:
George Browning,
by Robert Burns
Attorney.

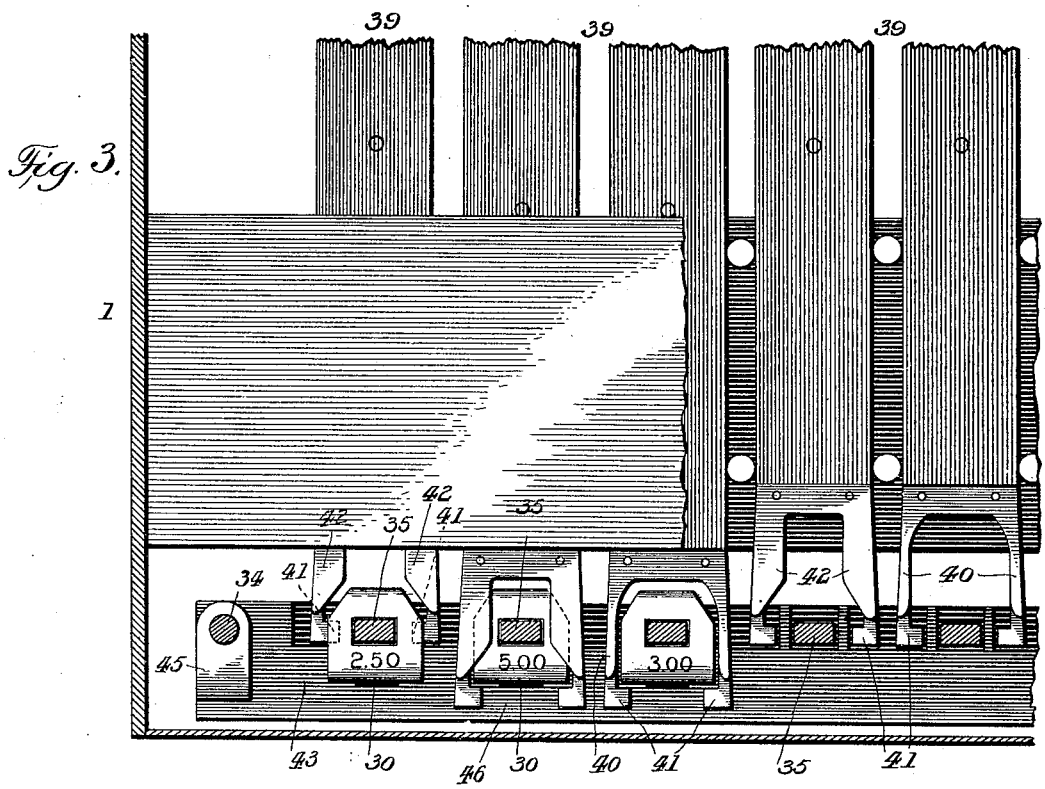
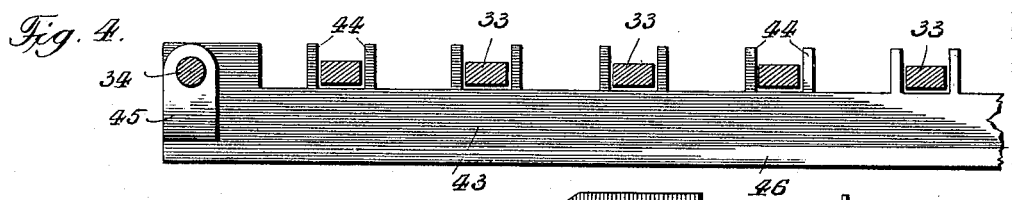
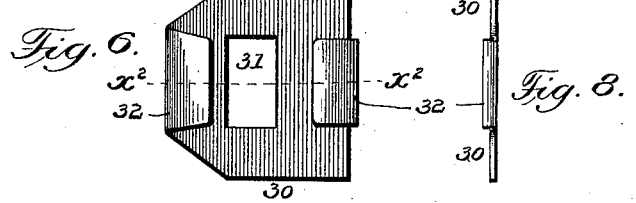
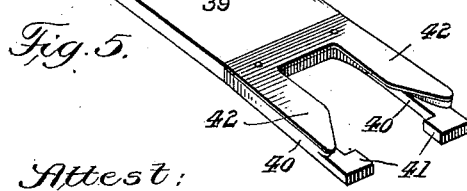

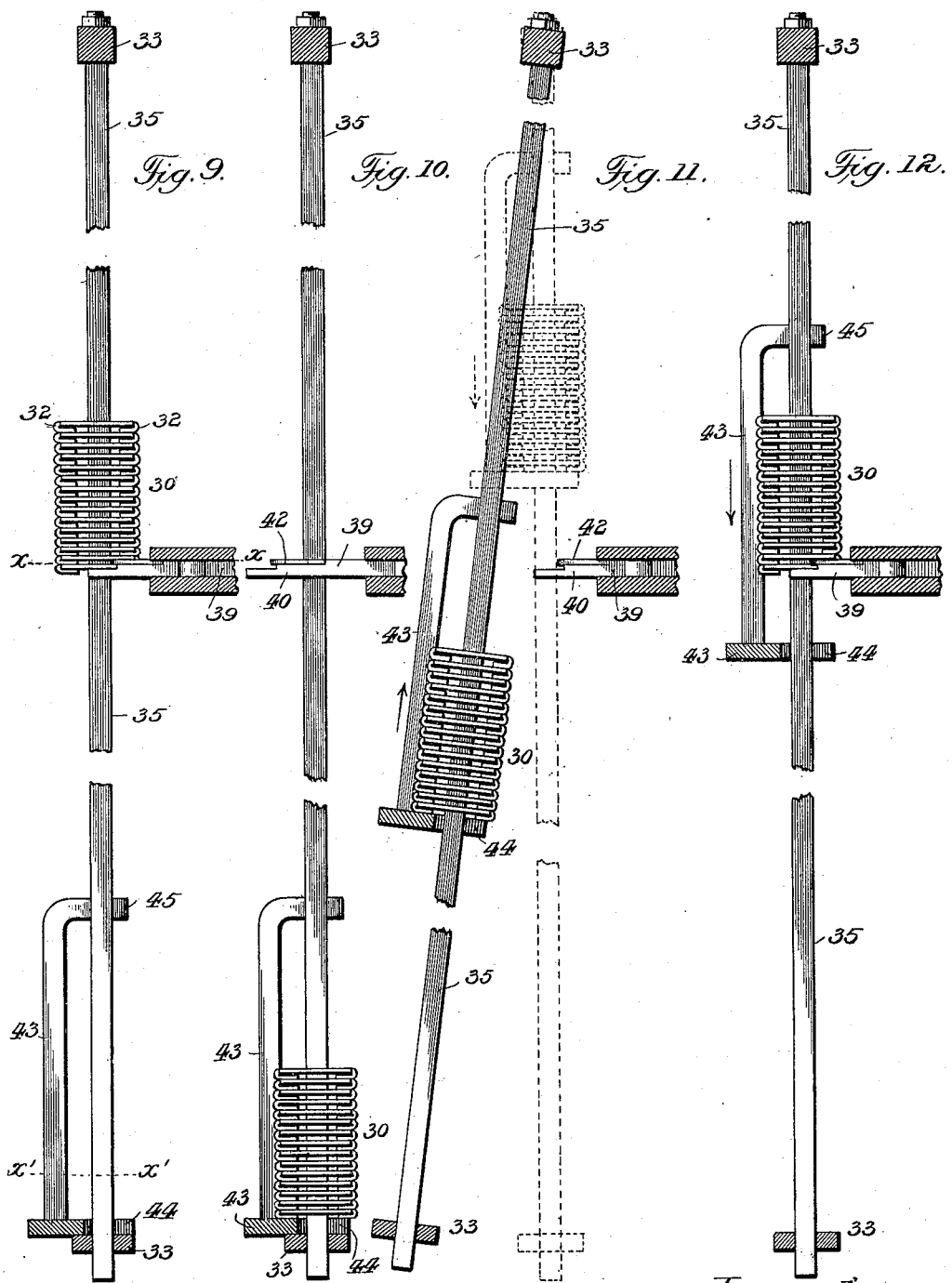

No. 679,251. Patented July 23, 1901.
G. BROWNING.
CASH REGISTER.
(Application filed Oct. 15, 1900.)
(No Model.) 6 Sheets—Sheet 5.
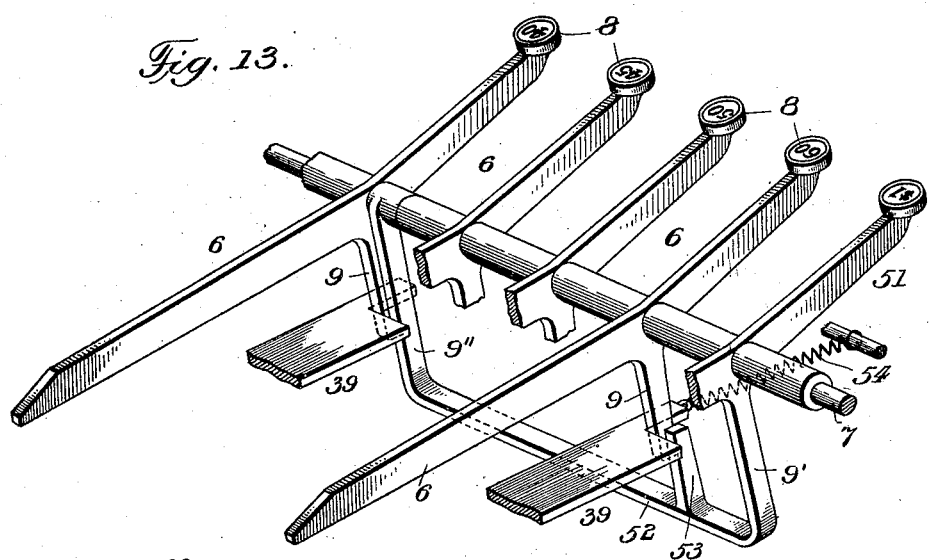
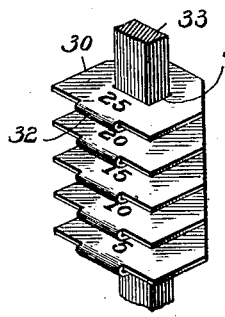
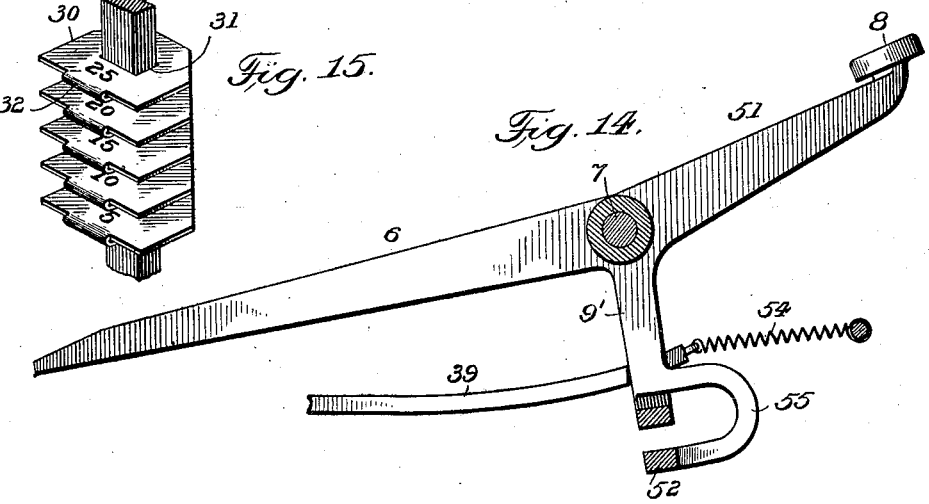
Attest:
John Enders Jr.
Henry A. Nott.
Inventor:
George Browning,
by Robert Burns
Attorney.

No. 679,251. Patented July 23, 1901.
G. BROWNING.
CASH REGISTER.
(Application filed Oct. 15, 1900.)
(No Model.) 6 Sheets—Sheet 6.

Attest:
John Enders Jr.
Henry A. Nott.

Inventor:
George Browning,
by Robert Burns
Attorney.

THE NORRIS PETERS CO., PHOTO-LITHO., WASHINGTON, D. C.

UNITED STATES PATENT OFFICE.

GEORGE BROWNING, OF HINSDALE, ILLINOIS, ASSIGNOR OF ONE-HALF TO WILLIAM HENRY POWELL, OF CHICAGO, ILLINOIS.

CASH-REGISTER.

SPECIFICATION forming part of Letters Patent No. 679,251, dated July 23, 1901.

Application filed October 15, 1900. Serial No. 33,152. (No model.)

*To all whom it may concern:*

Be it known that I, GEORGE BROWNING, a subject of the Queen of Great Britain, and a resident of Hinsdale, in the county of Dupage and State of Illinois, have invented certain new and useful Improvements in Cash-Registers, of which the following is a specification.

This invention relates to that class of cash-registers in which a multiple series of tokens or tallies are provided, each series being individual to a specified sum of the cash sales to be registered and adapted to consecutively register each succeeding sale in its individual column of tokens in a manner which enables the sum total to be easily calculated.

Various objects of the present improvement are as follows: first, to provide a simple and effective mechanism by means of which the tokens or tallies are successively dropped into the indicating-column upon each actuation of such mechanism and in a positive manner; second, to provide a simple and convenient means for resetting the tokens or tallies after the sum total of the cash registered has been taken upon the ending of the day's work or other like period; third, to provide a simple and efficient mechanism by means of which an operating-key for a higher amount will actuate simultaneously the operating mechanisms of two or more series of tokens or tallies whose combined amount will equal that of the aforesaid higher amount, and thus register such higher amount without a special provision in the apparatus of an individual series of tokens or tallies and operating mechanism for such higher amount; fourth, to provide a simple, effective, and automatic cash-drawer mechanism for cash-registers in which the releasing and opening of the cash-drawer is controlled by the cash-register mechanism and with which the drawer is supported in a manner capable of easy movement, all as will hereinafter more fully appear and be more particularly pointed out in the claims.

I attain such objects by the construction and arrangement of parts illustrated in the accompanying drawings, in which—

Figure 2:
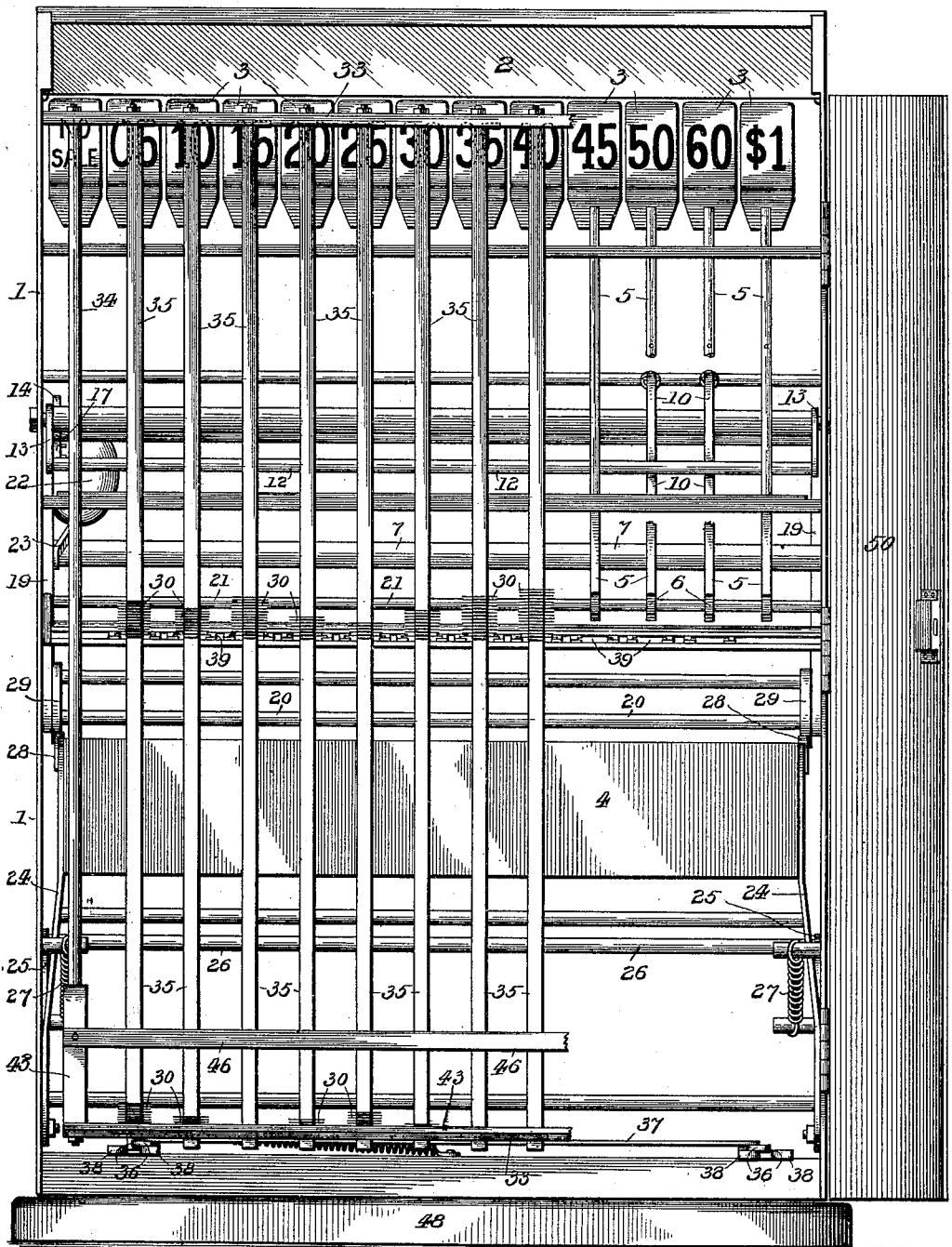
Figure 16:
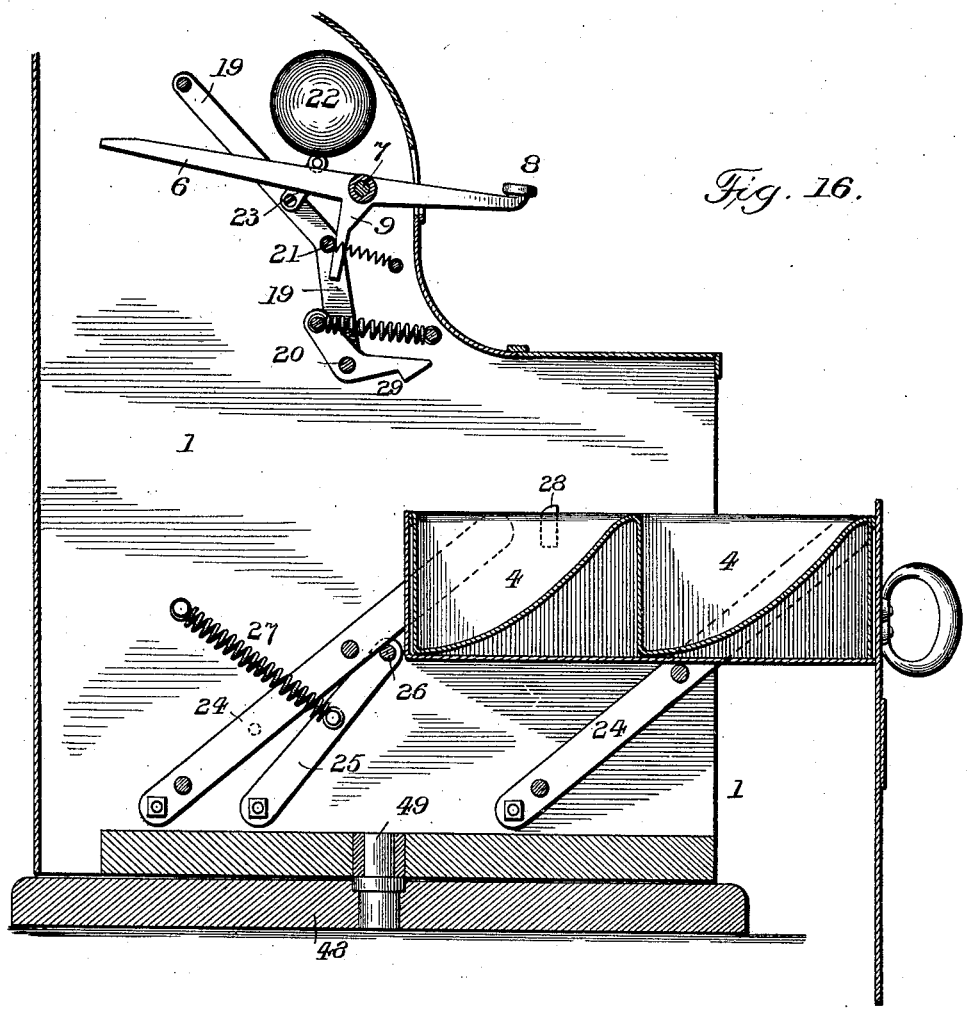
Figure 17:
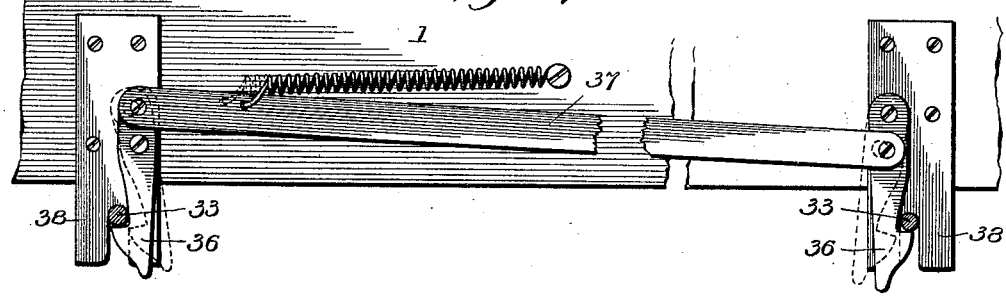

Figure 1 is a sectional elevation of a cash-register embodying the present improvements; Fig. 2, a rear elevation of the same with the door or closure plate of the same swung open and with parts of the mechanism broken away to illustrate other mechanism back of the same; Fig. 3, an enlarged detail horizontal section at line $x$ $x$, Fig. 9, with various parts removed and illustrating in different positions the actuating slides by means of which the indicating-tokens are serially dropped to effect a total registration; Fig. 4, an enlarged detail horizontal section at line $x'$ $x'$, Fig. 9; Fig. 5, a detail perspective view of the token-engaging end of one of the actuating-slides by which said tokens are dropped in a serial manner; Fig. 6, a bottom view of one of the tokens; Fig. 7, a longitudinal section of the same at line $x^2$ $x^2$, Fig. 6; Fig. 8, an end view of the same. Figs. 9, 10, 11, and 12 are enlarged detail sectional elevations illustrating the various positions of the actuating-slides, the series of tokens, and the carriage that receives and resets the series of tokens; Fig. 13, a detail perspective view of the manual-actuating mechanism, illustrating the mechanism by means of which a compound action of two or more actuating-slides is simultaneously effected to attain a compound or higher registration; Fig. 14, a detail sectional elevation of the same in a modified form; Fig. 15, a detail perspective view of a series of the indicating-tokens of the present invention in superimposed relation and illustrating the system of cumulative numbering of the present invention; Fig. 16, a detail sectional elevation illustrating the manual-actuating mechanism and the cash-drawer and its supporting mechanism in a position the reverse to that shown in Fig. 1; Fig. 17, a detail horizontal section illustrating the latch mechanism for the lower end of the swinging guide-frame and carriage for the multiple series of tokens of the present invention.

Similar numerals of reference indicate like parts in the several views.

Referring to the drawings, 1 represents the main inclosing casing of any usual and approved construction, the upper portion of which is provided with the usual transparent openings 2, through which are visible the indicating cards or plates 3, that are successively brought into view to indicate the amount of each successive purchase, while the lower portion of such casing houses the money-drawer 4, the automatic locking of which, as well as its movable connection with such casing, will hereinafter be more fully described.

5 represents a series of rods having vertical movement in guides within the main casing 1 and carrying at their upper ends the series of purchase-indicating cards 3, while their lower ends are arranged in the path of the inner ends of the operating levers or keys 6 of the apparatus.

6 represents the operating keys or levers pivoted upon a common shaft 7 within the casing, their inner ends being adapted to engage the lower ends of the vertically-moving indicator-rods 5 to impart an upward movement to the same, while their outer ends, which project outside the casing, so as to be capable of manipulation by hand, are provided with flattened heads 8, preferably numbered as usual to facilitate the selection of the particular key or lever to be operated in effecting the registration of any desired amount. Such keys or levers are also provided with pendent arms 9, that are adapted to engage and operate a series of actuating-slides, by means of which a multiple series of registering-tokens are consecutively dropped, as will hereinafter more fully appear.

10 represents a series of spring-detents adapted to individually engage in notches 11 in the series of vertically-moving indicator-rods 5 to lock the same in a raised and visible position.

12 is a transversely-extending vibratory bar or rod common to the entire series of spring-detents 10 and adapted to engage the lower end of the same to effect a disengagement of any one of the same that may be in engagement with an indicator-rod 5. Such bar 12 is carried at its respective ends by bell-crank levers 13, preferably pivoted on the same axis with the series of spring-detents 10, and carrying on its opposite arm a trip mechanism, as follows: 14 is a cam or trip plate pivoted to the said arm at 15 and provided with a cam-face 16 and a toe or prolongation 17, adapted at a period near the final movement of said trip-plate to engage a stud or projection 18 on said arm to impart a vibratory movement to the bell-crank lever and to the bar or rod 12 to effect a disengagement of the spring detent or detents 10 already in engagement with their vertical moving indicator rod or rods 5.

19 represents intermediate levers arranged at opposite sides of the main casing and connected together to work in unison by suitable tie-rods, as shown. Such levers are pivoted at 20 to the casing and are provided with a transverse rod 21, that has engagement with the pendent arms 9 of the operating keys or levers 6, so as to receive motion therefrom. In the present construction the upper ends of such levers are adapted to engage the cam-face 16 to operate the detent-releasing mechanism, just described, and by a further movement past such cam-face allow such detent mechanism to return to its normal position, ready to engage the next succeeding indicator-rod 5 as it is raised to its final elevation by a continued and final movement of the actuating-lever 6. In the special construction shown the return movement of the intermediate levers 19 will trip the pivoted cam-plate 14 in passing the same without affecting the detent-releasing mechanism or the previous engagement of any one of such detents.

22 is the usual alarm-bell, adapted to give a sound indication of an operation of the present cash-registering mechanism, the operating mechanism thereof being connected by link 23 with the intermediate lever 19, as shown in Fig. 1.

24 represents pairs of counterpart links pivoted at their lower ends to the lower end of the main casing and at their upper ends to the cash-drawer 4, so as to form a pivotal support therefor, the cash-drawer being wholly supported thereby and adapted to swing upon the same in the manner illustrated in Figs. 1 and 16.

25 is a spring bumper-frame that is adapted to receive the impact of the cash-drawer as it swings open and assist in the subsequent closing movement of such drawer. In the construction shown such spring bumper-frame comprises a pair of side bars pivoted to the casing and united together at their upper ends by means of a cross-rod 26, which constitutes an abutment for one set of the pivot-links 24, as shown in Fig. 16.

27 represents springs, by which said bumper-frame is held in its normal rearward position, as indicated in Fig. 1.

28 represents lateral lugs on the side of the cash-drawer.

29 represents spring-catches secured to the main casing and adapted to engage the lugs 28 to lock the cash-drawer in its closed position. In the construction shown the ends of said catches opposite to the drawer-engaging ends are adapted to engage with the intermediate levers 19, so as to be operated by the same to permit the opening movement of the cash-drawer as the cash-registering mechanism is operated to make a fresh registration of a sale.

In the present cash-registering mechanism the multiple series of register-tokens 30 will preferably be provided with a progressive or cumulative series of indicating-numerals, so that the numeral of the topmost plate will at all times indicate the total of the particular column or series, and in the present invention such tokens 30 will consist of flat plates having the numerals stamped or otherwise impressed thereon and preferably formed with central orifices 31, so that they may be guided and confined upon a suitable guide-rod, and with central thickened or reinforced portions 32 for convenience and certainty of manipulation in the cash-registering mechanism of the present invention.

The preferred mechanism for holding the multiple series of tokens 30 of the present invention, automatically feeding the same into the registering position and for resetting the same at the end of the day or other period of time is clearly illustrated in Figs. 1, 2, 3, 4, 9, 10, 11, 12, 15, and 17 and will comprise instrumentalities as follows: 33 is a vertically-arranged frame pivoted at its upper end in the main casing and extending the main height of the apparatus. Such frame consists of upper and lower horizontal connecting-bars, a pair of vertical end bars 34, and a series of vertically-extending bars 35, connected at top and bottom to such horizontal connecting-bars and each adapted to hold an individual series of tokens or tallies 30 by means of their central perforations, said tokens being free to slide vertically on said vertical supporting-bars.

36 represents a pair of horizontally-arranged spring-catches arranged at opposite sides of the main casing and adapted to engage projections at the lower end of the frame 33 to lock the frame in its proper operative position with relation to the token-operating slides hereinafter described.

37 is a connecting-link arranged between the two catches 36 and adapted to impart uniform movement to both catches in the manual operation of either catch by the operator.

38 represents socket-plates for receiving the lower ends of the side bars 34 to hold the vertical token-holding frame 33 in proper position in a firm and substantial manner, all as illustrated in Fig. 17.

39 represents a series of counterpart reciprocating slides, one to each series of tokens, and the vertical carrying-bar of the same and arranged intermediate the height of the said bars, as shown in Figs. 1, 2, 9, 10, 11, and 12. Each of such slides receives a reciprocating movement from its individual operating-key 6 by engagement of the arm 9 of said key with the one end of said slide, and the said arm may have engagement with said slide, so as to impart both the active and return movement to the slide in a positive manner by a suitable positive connection between the parts, or the active movement only may be imparted to such slide by the loose abutment of the arm 9 against the slide, and the return movement effected by means of an individual spring.

In the present invention the multiple series of tokens, strung in the manner heretofore described upon their individual guide-rods 35, rest above and upon the rear ends of the respective slides 39 and are adapted to be singly released and dropped by said slides at each reciprocation of any particular slide. On being so released the tokens will slide down their respective rods 35 and rest upon the return-carriage hereinafter described to afford an indication of the total amount of sales of each series of tokens and which totals can afterward be added up to obtain the total or gross amount of the sales made during the day or other required period.

Referring to Fig. 3, in which the upper plate of the first and third slides is removed to better illustrate the construction of the token-engaging ends of the series of slides, 40 represents parallel forks or extensions at the rear or token-engaging ends of the series of slides 39, the space between such forks being large enough to permit the free passage of a token 30 therethrough, as indicated in the third slide from the right in said Fig. 3. 41 represents inturned prongs at the rear end of the forks 40, the space between the said prongs being less than the width of a token, and said prongs in the normal dormant position of the slide are adapted to engage under and support the series of tokens, as indicated in the fifth slide from the right in said Fig. 3. 42 represents a series of forked plates or members secured above the corresponding lower forks 40 a distance somewhat greater than the side thickness of a token 30. The opening between the forks 42 is open at the rear end and of a width less than that of a token 30, as shown in the second, fourth, and fifth slides from the right in Fig. 3 and in Fig. 5.

With the construction above described and in the operation of releasing a token from the superimposed pile of tokens above the slide 39 the operation is as follows: In an active or rearward movement of the slide 39 the upper member or plate 42 first passes above the lowermost token of the superimposed pile as it rests upon and is supported by the inturned prongs 41 of the forks 40 and beneath the reduced outer side portions of the next token above to in turn constitute the support for the superimposed pile of tokens. With a continued rearward movement of the slide 39 the inturned prongs 41 pass from beneath the aforesaid lowermost token, and the same is free to pass down through the enlarged opening between the forks 40 and slide down the guide-rod 35 onto the receiver or carriage. With a forward or return movement of the slide 39 the upper member or plate 42 is drawn from beneath the pile of superimposed tokens, and the same are permitted to descend and be again supported by the inturned prongs 41, ready for a repetition of the operation just described.

43 is a vertically-moving carriage, having a horizontal member provided with projecting prongs 44, which embrace the respective guide-rods 35 of the multiple series of tokens and which are adapted to receive the series of tokens as they are discharged by the series of slides 39, as above described, from the superimposed piles of tokens. At each side the carriage 43 is provided with guide eyes or frames 45, that embrace the vertical end bars 34 of the vertically-arranged frame 33, so as to be capable of vertical movement on the same.

46 is a cross-bar for convenience in operating the carriage.

The above-described construction, in connection with the pivoted nature of the frame 33, is adapted to afford a ready and convenient means for resetting the apparatus after a day's work or other specified period in that by swinging the frame 33 outward, as indicated in Fig. 11, the carriage is free to be moved upward past the series of slides 39, after which the frame 33 and carriage 43 can be swung back into their normal position in the manner indicated by dotted lines in Fig. 11, after which the carriage is again lowered into its original depressed condition, as illustrated in Fig. 9, leaving the piles or multiple series of tokens resting above the slides ready for a fresh use of the cash-registering mechanism, the catch mechanism 36 and 37 affording the necessary means for permitting the above operation and subsequently securing the parts in proper operative position.

47 is a transparent window or orifice formed in the side wall of the main casing preferably on a line with the multiple series of tokens 30 as they are supported in their elevated position in the apparatus, and such window or orifice is adapted to admit light to such series of plates, so that their condition may be readily observed by the operator when so desired.

48 is a stationary base, upon which the main casing is supported by means of an enlarged pivoted stud 49, so as to permit of the ready turning of the cash-register for convenience in resetting the multiple series of tokens and other like operations connected with the cash-register.

50 is a door closing the rear or back portion of the main casing and affording access to the token carrying and operating mechanism.

Another part of the present invention involves a combined mechanism whereby two or more of the series of tokens and the operating-slides can be operated simultaneously by means of an independent key or lever to indicate a sum equal to the combined value of the said two or more series. In Figs. 13 and 14 I illustrate means whereby such result is attained. In the drawings, 51 represents an independent key adapted to register a higher amount—as, for instance, one dollar. Such key will be of the same general construction as the other keys heretofore described, the slide-operating arm 9' being of a modified construction, however, so that it will have operative connection with two or more of the registering slides and mechanisms—as, for instance, the "forty-cents" and "sixty-cents" slides and mechanisms, as shown in Fig. 13. In my preferred construction, as shown in Figs. 13 and 14, the arm 9' will be connected at its lower end to a transversely-extending horizontal bar 52, which in turn is connected at the other end with a supplementary arm 9'', that has pivotal movement on the same axis as the arm 9', as shown in Fig. 13. Such arm 9'' may directly engage one of the pair of slides that is to be simultaneously operated by the composite key 51, while the bar 52 will be provided with a prong or projection 53 for operating the other slide of the pair to be operated. With this type of operating-keys the slides 39 can only be operated positively in one direction by said keys. Their return movement will accordingly be effected by springs 54, individual to the respective slides. In a cash-register mechanism in which a series of such composite keys are employed and where of necessity the horizontal bars 52 will extend past each other free and independent movement for such bars will be provided by the yoke-shaped formation 55 in the arms 9' or 9'', as the circumstances may require.

Having thus fully described my said invention, what I claim as new, and desire to secure by Letters Patent, is—

1. In a cash-register of the character herein described, the combination of a multiple series of tokens having a plate formation and provided with centrally-arranged guide-openings, a series of vertically-arranged guide-rods engaging said openings, and a series of operating-slides bifurcated at their engaging ends so as to straddle the vertical guide-rods and adapted to support the series of tokens in a superimposed condition and release the same serially, substantially as set forth.

2. In a cash-register of the character herein described, the combination of a multiple series of tokens having a plate formation and provided with guide-openings, a series of guide-rods engaging said openings, a series of operating-slides adapted to support the series of tokens in a superimposed condition and to release the same serially, a swinging frame carrying said guide-rods, and a catch for securing said frame in proper relation to the operating-slides, substantially as set forth.

3. In a cash-register of the character herein described, the combination of a multiple series of tokens having a plate formation and provided with guide-openings, a series of guide-rods engaging said openings, a series of operating-slides adapted to support the series of tokens in a superimposed condition and to release the same serially, a swinging frame carrying said guide-rods, a catch for securing said frame in proper operative position, and a carriage sliding vertically on said frame and adapted to receive the tokens as they are released by the operating-slides, substantially as set forth.

4. In a cash-register of the character herein described, the combination of a multiple series of tokens having a plate formation and provided with guide-openings and reinforced central portions, a series of guide-rods engaging said openings, a series of operating-slides adapted to support the series of tokens in a superimposed condition and to release the same serially, said slides being provided at their token-engaging ends with upper and lower fork members, the lower members having inturned prongs at their rear ends, substantially as set forth.

5. In a cash-register of the character herein described, the combination of a multiple series of tokens having a plate formation and provided with guide-openings and reinforced central portions, a series of guide-rods engaging said openings, a series of operating-slides adapted to support the series of tokens in a superimposed condition and to release the same serially, said slides being provided at their token-engaging ends with upper and lower fork members, the lower members having inturned prongs at their rear ends, a swinging frame carrying the series of guide-rods, and a catch for securing said frame in proper operative position, substantially as set forth.

6. In a cash-register of the character herein described, the combination of a multiple series of tokens having a plate formation and provided with guide-openings and reinforced central portions, a series of guide-rods engaging said openings, a series of operating-slides adapted to support the series of tokens in a superimposed condition and to release the same serially, said slides being provided at their token-engaging ends with upper and lower fork members the lower members having inturned prongs at their rear ends, a swinging frame carrying the series of guide-rods, a catch for securing said frame in proper operating position, and a carriage sliding vertically on said frame and adapted to receive the tokens as they are released by the operating-slides, substantially as set forth.

7. In a cash-register of the character herein described, the combination of a multiple series of tokens, a series of operating-slides adapted to support the series of tokens in a superimposed condition and to release the same serially, a series of pivoted levers or keys for individually operating said slides, and a composite lever or key having connection with two or more slides and adapted to operate the same simultaneously to effect a composite registration, substantially as set forth.

8. In a cash-register of the character herein described, and in which a multiple series of separate tokens are successively manipulated to register consecutive purchases, the combination with the operating keys and slides for manipulating said tokens, of a series of indicating-cards, a series of vertically-moving card-carrying rods having operative engagement with the series of slide-operating keys and provided with notches intermediate their length, a series of spring-detents adapted to engage in said notches, a swinging frame adapted to operate said detents to a release, cam-plates pivoted to said frame and adapted to operate the same in its detent-releasing movement, and intermediate levers operatively connected to the series of operating-keys and adapted to engage and operate said cam-plates, substantially as set forth.

9. In a cash-register of the character herein described, the combination with the main casing, of a swinging cash-drawer arranged to move in said casing, pairs of pivoted links forming the supporting means for the cash-drawer, a spring buffer-frame arranged in the path of said links, and means controlled by the cash-registering mechanism for unlocking the cash-drawer from its closed position, substantially as set forth.

Signed at Chicago, Illinois, this 13th day of October, 1900.

GEORGE BROWNING.

Witnesses:
 ROBERT BURNS,
 WILLIAM HENRY POWELL,